United States Patent [19]

Watashi

[11] Patent Number: 4,850,584

[45] Date of Patent: Jul. 25, 1989

[54] BEARING ARRANGEMENT IN SHEET MEMBER FEED APPARATUS FOR USE IN ELECTROPHOTOGRAPHIC COPYING MACHINE

[75] Inventor: Masahiro Watashi, Ikoma, Japan

[73] Assignee: Mita Industrial Co., Ltd., Osaka, Japan

[21] Appl. No.: 884,966

[22] Filed: Jul. 14, 1986

[30] Foreign Application Priority Data

Jul. 15, 1985 [JP] Japan .............................. 60-107977[U]
Jul. 24, 1985 [JP] Japan .............................. 60-113585[U]

[51] Int. Cl.$^4$ ............................................... B65H 5/06
[52] U.S. Cl. ..................................... 271/274; 384/215; 384/218
[58] Field of Search ................. 271/274; 226/187, 194, 226/186; 384/215, 218, 219

[56] References Cited

U.S. PATENT DOCUMENTS

| | | | |
|---|---|---|---|
| 428,700 | 5/1890 | Snyder et al. | 226/187 X |
| 1,876,369 | 9/1932 | Waterworth | 226/187 X |
| 4,361,399 | 11/1982 | Sawada et al. | 271/274 |
| 4,387,889 | 6/1983 | Koyama et al. | 271/274 X |
| 4,674,735 | 6/1987 | DuBois et al. | 271/274 X |

FOREIGN PATENT DOCUMENTS 2939185 4/1981 Fed. Rep. of Germany ...... 271/274

Primary Examiner—H. Grant Skaggs
Attorney, Agent, or Firm—Wenderoth, Lind & Ponack

[57] ABSTRACT

A sheet member feed apparatus for use in an electrophotographic copying machine includes a frame with a pair of spaced opposed walls, each wall having therein an elongated hole defined by longitudinally extending inner wall side faces. First and second feed rollers are mounted on first and second shafts, respectively, with each shaft having bearings at opposite ends thereof. The bearings of one shaft are mounted at fixed positions in the opposed frame walls, and the bearings of the other shaft are mounted in the elongated holes with clearance between outer side faces of the bearings and the confronting inner wall side faces, such that the other roller is movable toward and away from the one roller. A spring extends around a portion of each of the bearings of the other roller and biases the bearings in the elongated holes in a direction to urge the other roller toward the one roller. As a result, rotation of the other roller tends to cause the outer side faces of the bearings thereof to repeatedly impact against confronting inner wall side faces of the respective elongated holes. Biasing structure prevents such repeated impacting by biasing the bearings of the other roller such that the resultant force of forces acting on such bearings extend from the center of the shaft of such roller toward one longitudinal inner wall side face of the respective elongated holes at a particular angle of inclination.

6 Claims, 4 Drawing Sheets

BEARING ARRANGEMENT IN SHEET MEMBER FEED APPARATUS FOR USE IN ELECTROPHOTOGRAPHIC COPYING MACHINE

FIELD OF THE INVENTION

The present invention relates to improvements in a bearing arrangement in a sheet member feed apparatus for use in an electrophotographic copying machine. More particularly, the present invention relates to an improved sheet member feed apparatus, wherein chattering due to movements of a bearing are not generated, for use in an electrophotographic copying machine.

BACKGROUND OF THE INVENTION

There is known a sheet member feed apparatus having a pair of feed rollers for use in a copying machine such as an electrophotographic machine and the like.

FIG. 6 schematically illustrates the bearing arrangement for one side of such known sheet member feed apparatus.

Referring to FIG. 6, an elongated bearing installation hole (hereinafter referred to as "elongated hole") 3 is provided in a side plate of a frame (not shown) for an upper feed roller 1. A bearing 6 is installed to be movable upwardly and downwardly in the elongated hole 3, with a clearance d remaining between bearing 6 and the surrounding inner wall faces defining the elongated hole 3.

Axis 5 of the upper feed roller 1 is fixed to the bearing 6. Biasing spring 4 is extended over a projected portion of the bearing 6 so as to urge the upper roller 1 downwardly against a lower roller 2.

In this known sheet member feed apparatus, since the biasing spring 4 is simply placed around the bearing 6 in the manner explained above and since a clearance remains between the bearing 6 and the surrounding inner wall faces 3a of the elongated hole 3, a force f1 to urge the upper roller 1 against the lower roller 2 is effected only from the center of the axis 5 of the upper roller 1 toward the center of an axis 8 fixed to a bearing 10 of the lower roller 2 and is directed downward in a direction such that the bearing 6 moves toward the bottom inner face of the elongated hole 3.

As long as the movement of the bearing 6 remains in a vertical direction, chattering is not generated since sufficient clearance exists to allow smooth movement of the bearing 6 in the elongated hole 3, and the movement of the bearing 6 is restricted appropriately by the action of the biasing spring 4 and also the action of the lower roller 2.

However, in such known sheet member feed apparatus, it actually often occurs that the bearing 6 rolls from side to side during the operation of the apparatus, such that impacts occur between outer side faces 6a of the bearing 6 and inner wall side faces 3a of the elongated hole 3, thereby unavoidably generating chattering causing not only mechanical defects but also other disadvantages, for instance, such as:

(i) unpleasant noise is generated,
(ii) mechanical friction is caused, thus decreasing durability of the apparatus, and
(iii) in the case of an electrophotographic copying machine, undesired pressure is imparted to a copied paper, thus causing damage to images developed thereon and the like.

The occurrence of such chattering is due to the fact that the rotational force in the rolling operation of the upper roller 1 and the lower roller 2 is affected to the bearing 6 in the same direction so that of the rotation of the roller 1. Thus, one end portion of one outer side wall 6a and the opposite end portion of the other outer side wall 6a of the bearing 6 individually impact against the corresponding inner side wall faces 3a of the elongated hole 3, since the tolerance of the elongated hole 3 enabling movement of the bearing 6 is limited. Since the biasing spring 4 is urged or charged in the rotational direction of the bearing 6, a reaction force of the biasing spring 4 acts on the bearing 6 to impart a rotational force of the biasing spring 4 to the bearing 6 in the direction opposite to the direction of rotation of the upper roller 1. As a result, the outer wall face ends of the bearing 6 repeatedly impact against inner wall side faces of the elongated hole 3, whereby the rotation of the bearing 6 is restricted.

SUMMARY OF THE INVENTION

Accordingly, it is an important object of the present invention to provide a sheet member feed apparatus for feeding a member such as paper without generation of any chattering due to movement of a bearing in an elongated hole.

Another object of the present invention is to provide an improved sheet member feed apparatus which is simple in structure and easy to assemble.

An additional object of the present invention is to provide an improved sheet member feed apparatus to smoothly feed a sheet member without damage to the sheet member itself or to images developed thereon.

These and other objects of the present invention are attained by providing an improved bearing arrangement in a sheet member feed apparatus, the improved apparatus comprising an elongated hole provided in a side plate of a frame of the apparatus, a bearing installed in the elongated hole for movement in the longitudinal direction thereof, a pair of sheet member feed rollers one of which is rotatable about an axis mounted on the bearing, and a biasing means acting on the bearing as to provide that a resultant force extending from the center point of the axis extends at a predetermined inclination with respect to the longitudinal direction of an inner wall side face of the elongated hole, thereby allowing smooth movement of the bearing without generation of chattering.

The present invention includes these and other novel features and the combination of parts hereinafter fully described and illustrated in the accompanying drawings, it being understood that various changes in the details may be made without departing from the scope of or sacrificing any of the advantages of the invention.

DETAILED DESCRIPTION OF THE PREFERRED EMBODIMENTS

The present invention will now be described with reference to the accompanying drawings which show embodiments of the invention but without limiting the scope of the invention.

Figure 1:
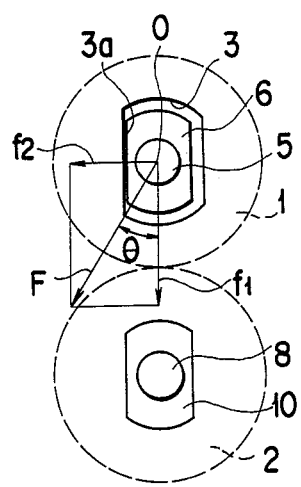
FIG. 1 schematically illustrates the principle of the improvements in bearing arrangements in an apparatus for feeding a sheet member without the generation of chattering, which is suitable for use in electrophotographic copying machines, according to the present invention.

FIG. 1 illustrates the principle of the present invention of an apparatus for feeding a sheet member while avoiding the generation of chattering due to the movements of the bearing and which is suitable for use in electrophotographic copying machines, which was found after repeated experiments by the present inventor. As shown in FIG. 1, a force $f_2$ to urge a bearing 6 against an inner wall side face 3a of an elongated hole 3 is effected from the center point of an axis or shaft 5 of an upper roller 1 toward the inner wall side face 3a of the elongated hole 3, in addition to a force $f_1$ to urge the upper roller 1 urged against the lower roller 2. This results in the bearing 6 always being urged against the inner wall side face 3a of the elongated hole 3, thereby preventing the generation of chattering resulting from impacts during the operation of the apparatus.

In more detail in this connection, a resultant force F results from a vector of the force $f_1$ and a vector of the $f_2$. The present inventor has found that when the resultant force F is effected from the center point 0 of the axis 5 in a longitudinal direction toward the inner wall side face 3a of the elongated hole 3 at a predetermined inclination $\theta$ to the vertical, the outer wall face of the bearing 6 is always maintained urged against the inner wall side face 3a of the elongated hole 3, thereby effectively preventing the generation of chattering such as occurs in the known apparatus.

As a result, the present inventor has determined the following facts:

(1) When the inclination $\theta$ is smaller than 5°, the force $f_2$ to urge the bearing 6 against the inner wall side face 3a of the elongated hole 3 is too small to incompletely prevent chattering.

(2) On the other hand, when the inclination $\theta$ exceeds 45°, the force $f_1$ to urge the upper roller 1 against the lower roller 2 becomes inferior to the force $f_2$, thus hindering the operation of feeding a sheet member by the upper roller 1 and the lower roller 2.

(3) However, when the inclination $\theta$ lies within the range of 5° to 45°, the generation of chattering effectively will be prevented and the operation of feeding a sheet member by the upper roller 1 and the lower roller 2 will be smoothly carried out. Further, when the inclination $\theta$ lies in the range of 10° to 45°, the prevention of the generation of chattering will be further improved and the operation of feeding a sheet member will be further smoothly carried out.

The present invention has been developed biased on these findings, and the embodiments of the improved sheet member feed apparatus according to the present invention as shown in FIG. 2, FIG. 3, FIG. 4 and FIG. 5 are preferred examples to realize the principle as above explained.

Figure 2:
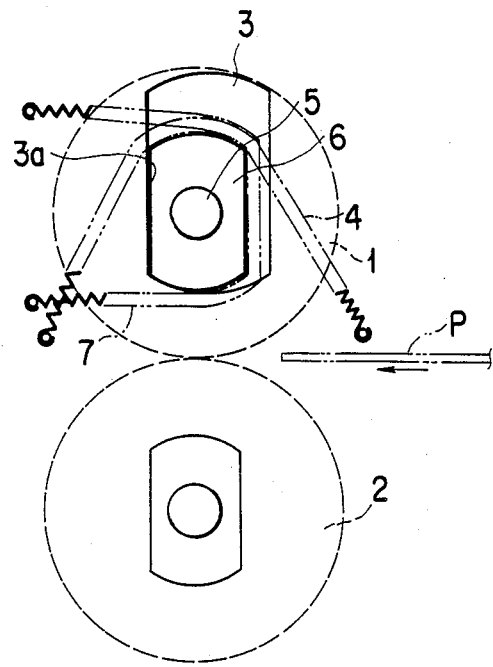
FIG. 2 schematically illustrates a preferred embodiment wherein two biasing means are employed.

FIG. 2 schematically illustrates a preferred embodiment of an improved bearing arrangement in a sheet member feed apparatus wherein two biasing springs are employed to ensure that the bearing 6 will be urged, at an inclination of the resultant force within the predetermined range, toward the inner wall side face 3a of the elongated hole 3. Referring to FIG. 2, a biasing spring 7 extends around the bearing 6 and biases bearing 6 generally sidewardly, in addition to biasing spring 4 also extending around the bearing 6 to urge the bearing downwardly. Thus, the bearing 6 is urged against the inner wall side face 3a of the elongated hole 3 at a predetermined inclination of the resultant force to the longitudinal direction of the inner wall side face 3a of the elongated hole 3 maintained by the actions of the biasing springs 4 and 7.

Figure 3:
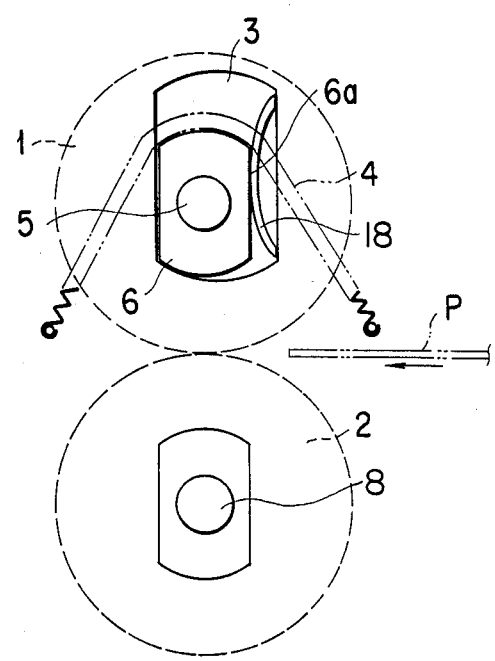
FIG. 3 schematically illustrates another preferred embodiment wherein a leaf spring is employed in addition to a biasing spring.

FIG. 3 schematically illustrates another preferred embodiment of an improved bearing arrangement in a sheet member feed apparatus wherein a leaf spring is employed in addition to the biasing spring to ensure that the bearing 6 will be urged, at an inclination of the resultant force within the predetermined range, toward the inner wall side face 3a of the elongated hole 3. Referring to FIG. 3, a leaf spring 18 is placed inside the elongated hole 3 in a way such that the outer wall face of the bearing 6 is pressed against the inner wall side face of the elongated hole 3. In this example, the leaf spring 18 is arched or bent and is positioned in the space between one inner wall side face of the elongated hole 3 and the respective outer wall side face 6a of the bearing 6, such that the arced portion of the leaf spring 18 is thrust against such outer wall side face 6a of the bearing 6, thereby urging the bearing 6 against the other inner wall side face of the elongated hole 3 in a direction transverse to the longitudinal direction of the elongated hole 3.

Figure 4:
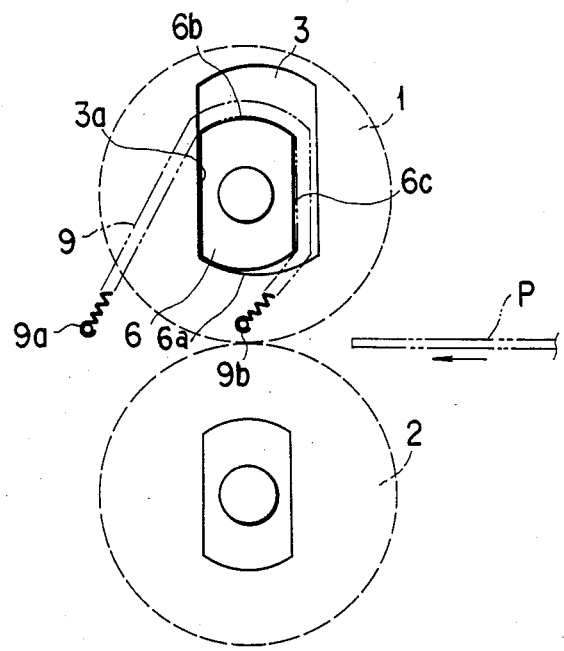
FIG. 4 schematically illustrates still another preferred embodiment wherein a biasing means is arranged in a particular manner.

FIG. 4 schematically illustrates still another preferred embodiment of the improved bearing arrangement in a sheet member feed apparatus wherein a single biasing spring extending around the bearing 6 is arranged in a particular way such that the outer side wall face of the bearing 6 is urged against the side inner wall face 3a of the elongated hole 3 at an inclination of the resultant force within the predetermined range. Referring to FIG. 4, the bearing is urged against the inner wall side face 3a of the elongated hole 3 by a biasing spring 9 extending around an upper outer wall face 6b and an opposite side outer wall face 6c of bearing 6. The spring 9 extends diagonally from faces 6b and 6c. One end 9a of spring 9 is fixed at a position located transversely outwardly of the elongated hole 3 and the other end 9b is fixed at a position located below the elongated hole 3. According to this embodiment, the objects of the present invention can be easily achieved by a simple structural modification of the arrangement of the biasing spring in the known apparatus to bias the bearing 6 in a direction to achieve the desired resultant force.

Figure 5:
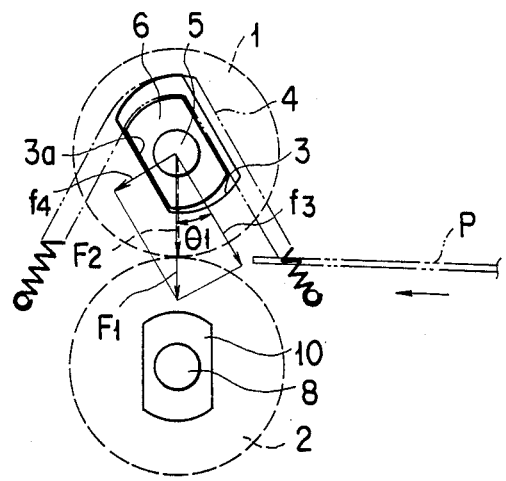
FIG. 5 schematically illustrates further another preferred embodiment wherein an elongated hole is inclined.
Figure 6:
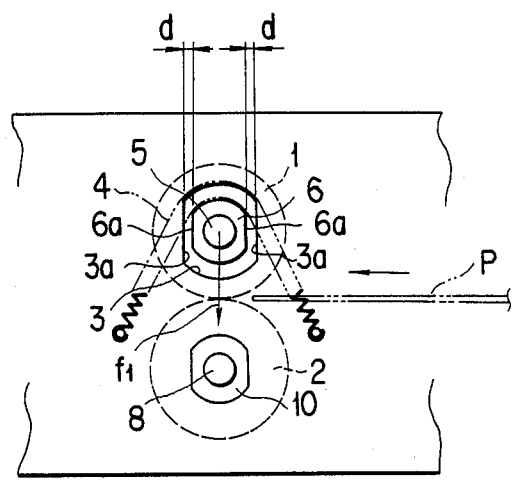
FIG. 6 schematically illustrates a known bearing arrangement.

FIG. 5 schematically illustrates another preferred embodiment of an improved bearing arrangement in a sheet member feed apparatus wherein the elongated hole 3 is installed in an inclined manner with a predetermined inclination according to the present invention. Such inclination causes the side outer wall face of the bearing 6 to be urged against the inner wall side face 3a of the elongated hole 3 to ensure the bearing 6 will be inclined to such inner wall side at a resultant force within the predetermined range according to the present invention. Referring to FIG. 5, the elongated hole 3 is inclined at a predetermined inclination $\theta_1$ to the direction at which a biasing means 4 presses the upper roller 1 against the lower roller 2. A component $f_3$ of the force $F_1$ ($f_3 = F_1 \cos \theta_1$) effected by the biasing means 4, such as a coiled spring extending around the bearing 6 in the form of an inverted V, acts in the longitudinal direction of the elongated hole 3, and a component $f_4$ of the force $F_1$ ($f_4 = F_1 \sin \theta$) acts against the inner wall side face 3a of the elongated hole 3 in a direction normal thereto. A force $F_2$ ($F_2 = f_3 \cos \theta_1$) acts in the direction of the force $F_1$ and urges the upper roller 1 against the lower roller 2. Then, a sheet member P (such as paper) is fed by the actions of the upper roller 1 and the lower roller 2 being urged together due to the force $F_2$. In this example, any biasing means other than the coiled spring, such as a leaf spring and the like, may be appropriately employed.

Any of the embodiments of the invention as shown in FIGS. 2 through 6 is sufficient to achieve the objects of the present invention, i.e. the lack of generation of chattering due to movements of the bearing in a sheet member feed apparatus and avoidance of other disadvantages caused by chattering, such as occurrences of unpleasant noise, mechanical friction, undesired pressure on a copied paper that would damage developed images, and the like, in the case of electrophotographic copying machines, and so on. The improved sheet member feed apparatus providing these significant advantages according to the present invention can be easily assembled simply by causing the bearing to have the particular inclination of the resultant force as above explained. Accordingly, and also due to the fact that it is not necessary to provide a closer tolerance between the bearing and the elongated hole, the productivity of a sheet member feed apparatus is remarkably improved.

Further, the invention provides the additional advantage of avoiding microscopic slippage that often occurs between the food rollers and a sheet member (paper) due to chattering during operation of the apparatus.

What is claimed is:

1. A sheet member feed apparatus for use in an electrophotographic copying machine, said apparatus comprising:

a frame including a pair of spaced opposed walls, each said wall having therein an elongated hole defined by inner wall faces including at least one longitudinal inner wall side face extending rectilinearly in the direction of elongation of said hole;

first and second sheet member feed rollers mounted on first and second shafts, respectively, each said shaft having bearings at opposite ends thereof;

said bearings of said first shaft being mounted at fixed positions in said opposed walls of said frame;

said bearings of said second shaft being mounted in said elongated holes in said opposed walls of said frame with clearance between outer side faces of said bearings and confronting inner wall side faces, such that said second roller is movable toward and away from said first roller;

biasing spring means extending around a portion of each of said bearings of said second roller for biasing said bearings in said elongated holes in a direction to urge said second roller toward said first roller, whereby rotation of said second roller tends to cause outer side faces of said bearings of said second roller to repeatedly impact against confronting inner wall side faces of respective said elongated holes; and means for preventing such repeated impacting, said preventing means comprising means for biasing said bearings of said second roller such that the resultant force of forces acting on each said bearing of said second roller extends from the center of said second shaft toward said one longitudinal inner wall side face of the respective said elongated hole at an inclination of between 5° and 45° with respect thereto, said biasing means of said preventing means comprising, for each said bearing of said second roller, a coil spring, separate from said spring biasing means, extending around a portion of said bearing and urging said bearing toward said one longitudinal inner wall side face of the respective said elongated hole.

2. An apparatus as claimed in claim 1, wherein said inclination is between 10° and 45°.

3. An apparatus as claimed in claim 1, wherein each said bearing of said second roller has longitudinally extending said outer side faces confronting respective longitudinal inner wall side faces of the respective said elongated hole.

4. A sheet member feed apparatus for use in an electrophotographic copying machine, said apparatus comprising:

a frame including a pair of spaced opposed walls, each said wall having therein an elongated hole defined by inner wall faces including at least one longitudinal inner wall side face extending rectilinearly in the direction of elongation of said hole;

first and second sheet member feed rollers mounted on first and second shafts, respectively, each said shaft having bearings at opposite ends thereof;

said bearings of said first shaft being mounted at fixed positions in said opposed wals of said frame;

said bearings of said second shaft being mounted in said elongated holes in said opposed walls of said frame with clearance between outer side faces of said bearings and contronting inner wall side faces, such that said second roller is movable toward and away from said first roller;

biasing spring means extending around a portion of each of said bearings of said second roller for biasing said bearings in said elongated holes in a direction to urge said second roller toward said first roller, whereby rotation of said second roller tends to cause outer side faces of said bearings of said second roller to repeatedly impact against confronting inner wall side faces of respective said elongated holes; and means for preventing such repeated impacting, said preventing means comprising means for biasing said bearings of said second roller such that the resultant force of forces acting on each said bearing of said second roller extends from the center of said second shaft toward said one longitudinal inner wall side face of the respective said elongated hole at an inclination of between 5° and 45° with respect thereto, said biasing means of said preventing means comprising, for each said bearing of said second roller, a spring positioned within the respective said elongated hole and acting on said bearing to urge said bearing toward said one longitudinal inner wall side face of said respective elongated hole.

5. An apparatus as claimed in claim 4, wherein said inclination is between 10° and 45°.

6. An apparatus as claimed in claim 4, wherein each said bearing of said second roller has longitudinally extending said outer side faces confronting respective longitudinal inner wall side faces of the respective said elongated hole.

* * * * *

UNITED STATES PATENT AND TRADEMARK OFFICE
CERTIFICATE OF CORRECTION

PATENT NO. : 4,850,584

DATED : July 25, 1989

INVENTOR(S) : Masahiro WATASHI

It is certified that error appears in the above-identified patent and that said Letters Patent is hereby corrected as shown below:

Column 6, line 33, change "wals" to --walls--;

line 37, change "bearing and contronting" to --bearings and confronting--.

Signed and Sealed this

Nineteenth Day of November, 1991

*Attest:*

HARRY F. MANBECK, JR.

*Attesting Officer*      *Commissioner of Patents and Trademarks*